United States Patent
Husband et al.

(10) Patent No.: US 11,139,716 B2
(45) Date of Patent: Oct. 5, 2021

(54) GAS TURBINE ENGINE SYSTEM WITH ELECTRICAL POWER EXTRACTION

(71) Applicant: ROLLS-ROYCE plc, London (GB)

(72) Inventors: Stephen M. Husband, Derby (GB); Gian Incerpi, Buckingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 16/516,796

(22) Filed: Jul. 19, 2019

(65) Prior Publication Data

US 2020/0052552 A1 Feb. 13, 2020

(30) Foreign Application Priority Data

Aug. 7, 2018 (GB) ...................................... 1812791

(51) Int. Cl.
*H02K 7/18* (2006.01)
*F02C 9/56* (2006.01)
*H02P 9/02* (2006.01)

(52) U.S. Cl.
CPC ............. *H02K 7/1823* (2013.01); *F02C 9/56* (2013.01); *H02P 9/02* (2013.01)

(58) Field of Classification Search
CPC ............ H02K 7/1823; F02C 9/56; H02P 9/02
See application file for complete search history.

(56) References Cited

U.S. PATENT DOCUMENTS

| 2006/0042252 A1* | 3/2006 | Derouineau | F02C 9/26 60/703 |
|---|---|---|---|
| 2014/0271114 A1* | 9/2014 | Phillips | G05B 23/0294 415/1 |
| 2014/0271117 A1* | 9/2014 | Armstrong | F02C 9/00 415/1 |
| 2015/0185111 A1* | 7/2015 | Armstrong | G01M 15/14 702/34 |

(Continued)

OTHER PUBLICATIONS

Great Britain search report dated Jan. 30, 2019, issued in GB Patent Application No. 1812791.0.

(Continued)

*Primary Examiner* — Viet P Nguyen
(74) *Attorney, Agent, or Firm* — Shumaker & Sieffert, P.A.

(57) ABSTRACT

An engine system comprises first and second electrical generators coupled to lower and higher pressure (LP, HP) shafts respectively of a gas turbine engine. A controller is arranged to receive a signal corresponding to a total electrical power demand $P_1$ and to output control signals to the electrical generators in response thereto such that the first and second electrical generators output electrical powers $(1-y)P_1$ and $yP_1$ respectively when $P_1 \leq P_{m1}$, where $0.5 < y \leq 1$ and $P_{m1}$ is the maximum electrical output power of the first electrical generator. By satisfying the demand $P_1$ mostly by extraction of electrical power from the first electrical generator when possible, the additional mechanical stress on the gas turbine engine resulting from electrical power extraction is reduced compared to the case where 50% or more of the demand $P_1$ is satisfied by the second electrical generator.

8 Claims, 3 Drawing Sheets

(56) References Cited

U.S. PATENT DOCUMENTS

2017/0187311 A1\* 6/2017 French .................... F02C 7/32
2017/0324360 A1\* 11/2017 Cline ................ G05B 23/0283
2018/0230844 A1\* 8/2018 Vondrell ................ F01D 15/10

OTHER PUBLICATIONS

European search report dated Nov. 28, 2019, issued in EP Patent Application No. 19184897.

\* cited by examiner

GAS TURBINE ENGINE SYSTEM WITH ELECTRICAL POWER EXTRACTION

CROSS-REFERENCE TO RELATED PATENT APPLICATIONS

This application is based upon and claims the benefit of priority from UK Patent Application No. GB1812791.0, filed on Aug. 7, 2018, the entire contents of which are incorporated herein by reference.

BACKGROUND

Technical Field

The present invention relates to gas turbine engine systems with electrical power output.

Description of the Related Art

In the context of aircraft propulsion, generation of electrical power from a gas turbine engine is of interest for a variety of applications, for example powering one or more electric propulsors and/or the auxiliary systems of an aircraft. In order to extract electrical power from a gas turbine engine, it is known to couple a respective electrical generator to each of one or more shafts or spools of the engine, however doing so affects the thermodynamic cycle of the engine and has an impact upon engine parameters such as fuel consumption and operating temperatures and pressures in the engine. Deriving electrical power from a gas turbine engine using one or more electrical generators, each of which is coupled to an engine shaft, generally results in a significant stress impact on the engine and an increased rate of mechanical degradation of the engine because mechanical work is performed on the electrical generators as well as on air accelerated by the engine. It is desirable to mitigate the mechanical stress impact on a gas turbine engine caused by extracting electrical power from the engine in order to increase the engine's operating lifetime.

SUMMARY

According to an example, a gas turbine engine system comprises a first sub-system having a first gas turbine engine and first and second electrical generators arranged to be driven by first and second spools respectively of the first gas turbine engine, the first spool having a lower rotational speed than the second spool during operation of the gas turbine engine, the engine system further comprising a controller arranged to provide first and second control signals to the first and second electrical generators respectively to control the electrical power extracted therefrom, such that when the total electrical power $P_1$ extracted from the first sub-system is less than or equal to $P_{m1}$ electrical powers $yP_1$, $(1-y)P_1$ are extracted from the first and second electrical generators respectively, where $0.5 < y \leq 1$ and $P_{m1}$ is the maximum output power of the first electrical generator.

The value of y may be unity.

The engine system may further comprise a second sub-system having a second gas turbine engine and third and fourth electrical generators arranged to be driven by first and second spools respectively of the second gas turbine engine, the third electrical generator having a maximum output power $P_{m1}$, the first spool of the second gas turbine engine having a lower rotational speed than the second spool thereof during operation of the second gas turbine engine, and the controller further being arranged to provide third and fourth control signals to the third and fourth electrical generators respectively to control the electrical power extracted therefrom, the controller being arranged to receive a demand signal corresponding to a total electrical power demand P to be met by the engine system and to provide the first to fourth control signals in response thereto such that the demand P is met by extraction of electrical powers xP, $(1-x)P$ from the first and second sub-systems respectively, wherein $0.5 < x < 1$, and wherein if $P \leq P_{m1}/x$, electrical powers xP, $(1-x)P$ are extracted from the first and third electrical generators respectively.

The second and third generators may provide electrical power output on a first power output channel, and the first and fourth electrical generators may provide power output on a second power output channel.

The second and fourth generators may each have a maximum power output $P_{m2}$ and the controller may be arranged to provide the first to fourth control signals in response to the demand signal such that if the total electrical power demand P is in the range $P_{m1}/x < P \leq (P_{m1}+\varepsilon P_{m2})/x$, where $0.5 \leq \varepsilon \leq 1$, the electrical powers extracted from the first to fourth electrical generators are $P_m$, $xP-P_{m1}$, $(1-x)P_{m1}/x$ and $(1-x)(xP-P_{m1})/x$ respectively.

The first sub-system may further comprise a fifth electrical generator arranged to be driven by the second spool of the first gas turbine engine and the second sub-system may further comprise a sixth electrical generator arranged to be driven by the second spool of the second gas turbine engine, the controller being arranged to provide fifth and sixth control signals to the fifth and sixth electrical generators respectively to control the electrical power extracted therefrom and the system being arranged such that the fifth and sixth electrical generators provide power output on a third power output channel.

The fifth and sixth generators may each have a maximum power output $P_{m3}$ and the controller may be arranged to provide the first to sixth control signals in response to the demand signal such that if the total electrical power demand P is in the range $(P_{m1}+\varepsilon P_{m2})/x < P \leq (P_{m1}+P_{m2}+P_{m3})/x$, then the powers extracted from the first to sixth electrical generators are $P_m$, $(xP-P_{m1})/2$, $(1-x)P_{m1}/x$, $(1-x)(xP-P_{m1})/2x$, $(xP-P_{m1})/2$, $(1-x)(xP-P_{m1})/2x$ respectively.

In embodiments having two sub-systems, the controller may be arranged to receive first and second data signals from the first and second gas turbine engines respectively, the first and second data signals corresponding to the remaining useful life and rate of mechanical degradation of the first and second gas turbines engines respectively, and to determine the fraction x such that the rates of mechanical degradation of the two gas turbine engines are adjusted so that the first and second gas turbine engines will reach their respective next service points at respective times defining an interval which is smaller than would be the case if x=0.5, and preferably equal to zero. The TGT temperature of a given gas turbine engine may be used as a measure of the rate of mechanical degradation of that gas turbine engine.

According to an example, a method of controlling electrical power extraction from an engine system which comprises a gas turbine engine and first and second electrical generators arranged to be driven by first and second spools respectively of the gas turbine engine, the first spool having a lower rotational speed than the second spool during operation of the gas turbine engine, comprises extracting electrical powers $yP_1$, $(1-y)P_1$ from the first and second electrical generators respectively in a case where the electrical power demand on the system is $P_1 \leq P_{m1}$, where $P_{m1}$ is the maximum electrical power output of the first electrical generator and $0.5 < y \leq 1$. In some embodiments y=1.

Except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE SEVERAL VIEWS OF THE DRAWINGS

Embodiments are described below by way of example only, with reference to the figures in which.

DETAILED DESCRIPTION

Figure 1:
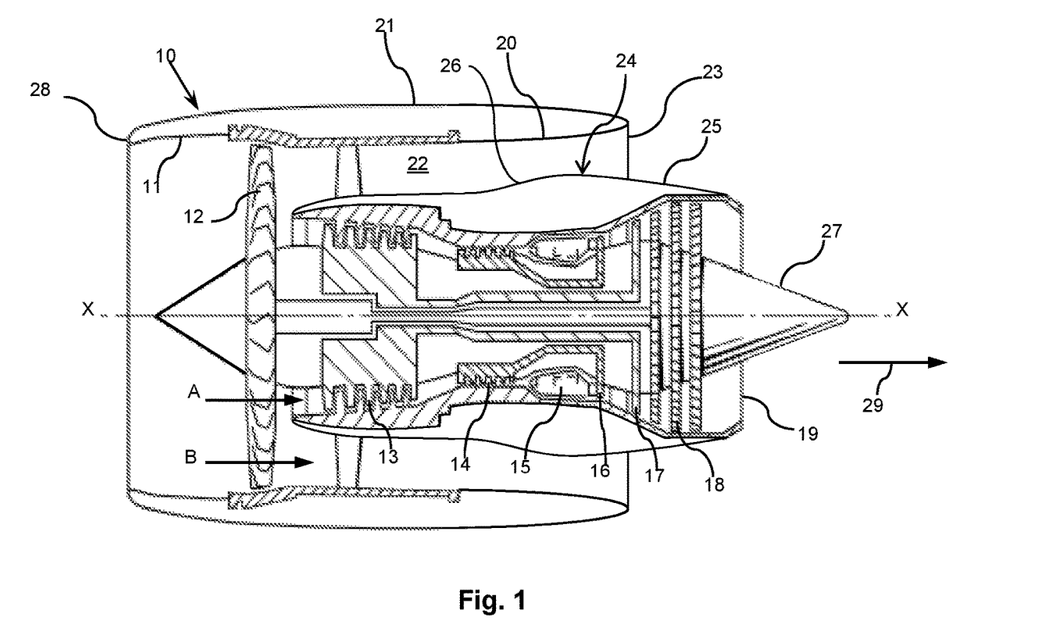
FIG. 1 is a longitudinal section through a known gas turbine engine.

Referring to FIG. 1, a known three-spool, separate-jets, turbofan engine 10 having a longitudinal (rotational) axis X comprises an engine core 24 having a core cowling 25 located radially inwardly of an outer fixed structure 21 with respect to the axis X. The outer fixed structure 21 terminates at its downstream end in a downstream terminal plane 23 which is substantially normal to the axis X. The portion of the core cowling 25 upstream of the terminal plane 23, and the internal surface of the outer fixed structure 21 which longitudinally coincides with that portion respectively define inner 26 and outer 20 walls of a bypass duct 22 which terminates at a bypass duct exit plane coincident with the downstream terminal plane 23 of the outer fixed structure 21. The engine core 24 extends downstream of the bypass duct exit plane 23 so that the engine core 24 has an afterbody portion. The engine core 24 terminates at a core exit plane 19 which is also substantially normal to the axis X. The engine 10 has a propulsive fan 12, intermediate 13 and high 14 pressure compressors, combustion equipment 15, and high 16, intermediate 17 and low 18 pressure turbines. A centre-body 27 extends through the core exit plane 19. The outer fixed structure has an intake highlight 28.

During operation of the engine 10, air and combustion products pass through the engine 10 in a general direction indicated by 29. Air entering the outer fixed structure 21 at the front of the engine is accelerated by the fan 12. Aft (downstream) of the fan 12 this air becomes divided into two air flows: a first air flow A into the intermediate pressure compressor 13 and a second air flow B which passes through the bypass duct 22. The intermediate pressure compressor 13 compresses the air flow directed into it before delivering that air to the high pressure compressor 14 where further compression takes place. Air flow B is output from the bypass duct 22 at the bypass duct exit plane 23 and provides the majority of the engine's thrust.

Compressed air output from the high-pressure compressor 14 is directed into the combustion equipment 15 where it is mixed with fuel and the resulting mixture combusted. The resulting hot combustion products then expand through, and thereby drive the high, intermediate and low-pressure turbines 16, 17, 18 before being exhausted through the exit plane 19 of the engine core 29 to provide further thrust. The high, intermediate and low pressure turbines 16, 17, 18 drive respectively the high pressure compressor 14, intermediate pressure compressor 13 and fan 12, each by means of a respective interconnecting shaft which has a rotation axis coincident with the longitudinal axis X of the engine 10.

Figure 2:
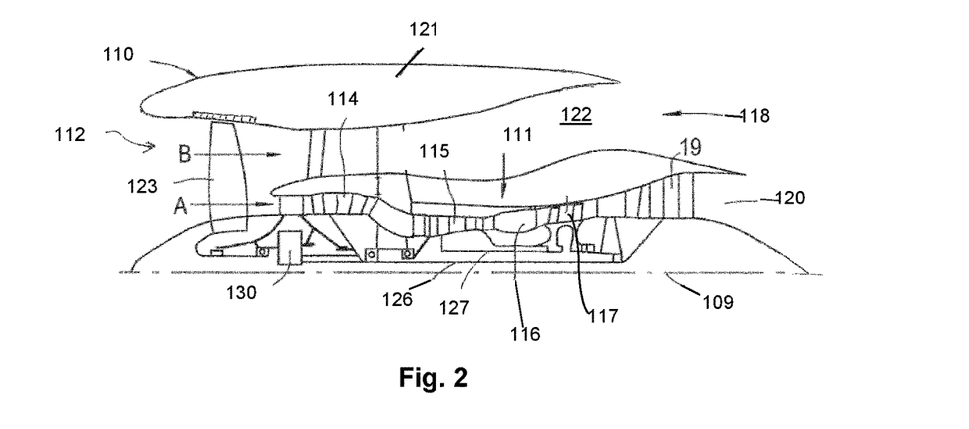
FIG. 2 is a partial longitudinal section through a known, geared, gas turbine engine.

FIG. 2 shows a partial longitudinal section of a geared gas turbine engine 110 having a principal rotational axis 109 (only structure on one side of the axis 109 is shown). The engine 110 comprises an air intake 112 and a propulsive fan 123 that generates two airflows: a core airflow A and a bypass airflow B. The gas turbine engine 110 comprises an engine core 111 that receives the core airflow A. The engine core 111 comprises, in axial flow series, a low pressure compressor 114, a high-pressure compressor 115, combustion equipment 116, a high-pressure turbine 117, a low pressure turbine 119 and a core exhaust nozzle 120. A nacelle 121 surrounds the engine core 111 and defines a bypass duct 122 and a bypass exhaust nozzle 118. The bypass airflow B flows through the bypass duct 122. The fan 123 is attached to and driven by the low pressure turbine 119 via a shaft 126 and an epicyclic gearbox 130.

In operation of the engine 110, the core airflow A is accelerated and compressed by the low pressure compressor 114 and directed into the high pressure compressor 115 where further compression takes place. The compressed air exhausted from the high pressure compressor 115 is directed into the combustion equipment 116 where it is mixed with fuel and the mixture is combusted. The resultant hot combustion products then expand through, and thereby drive, the high pressure and low pressure turbines 117, 119 before being exhausted through the nozzle 120 to provide some propulsive thrust. The high pressure turbine 117 drives the high pressure compressor 115 by a suitable interconnecting shaft 127. The fan 123 generally provides the majority of the propulsive thrust. The epicyclic gearbox 130 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 120, 122 meaning that the flow through the bypass duct 122 has its own nozzle that is separate to and radially outside the core engine nozzle 120. However, this is not limiting, and any aspect of the present disclosure may also apply to engines in which the flow through the bypass duct 122 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

Figure 3:
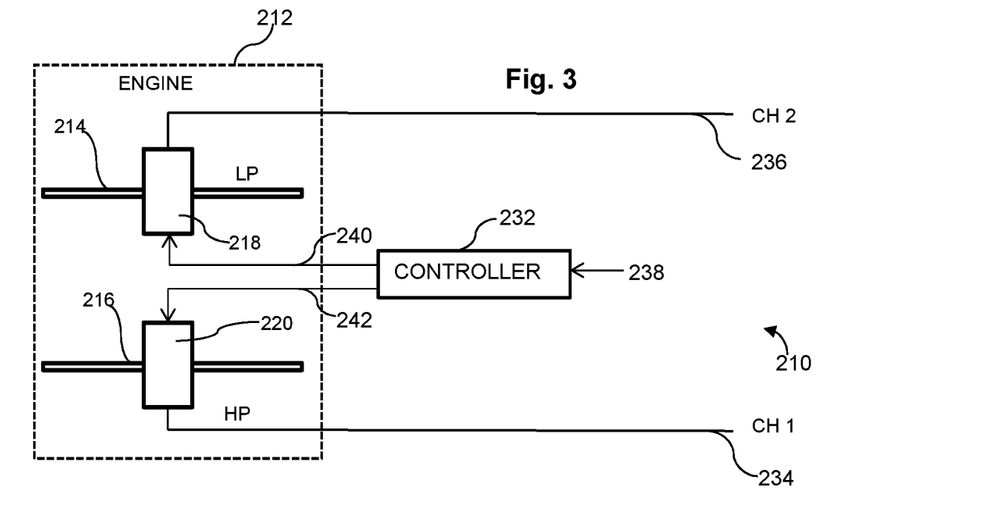
FIG. 3 shows a gas turbine engine system according to a first example, the system comprising a single gas turbine engine and two electrical generators.

Referring to FIG. 3, a first example gas turbine engine system is indicated generally by 210 and comprises a sub-system 212 which includes a gas turbine engine having a first, low pressure (LP) shaft 214 and a second, high pressure (HP) shaft 216 which form parts of LP and HP spools respectively of the gas turbine engine which may for example have the structure of either of the engines 10 or 110 shown in FIGS. 1 and 2. The LP and HP shafts 214, 216 are each coupled to a respective electrical generator having a maximum electrical power output $P_m$, i.e. a first electrical generator 218 and a second electrical generator 220. An example value of $P_m$ is 100 kW. The first and second electrical generators 218, 220 are each coupled to a respective shaft 218, 220, or are otherwise adapted, such that the amount of electrical power derived from the corresponding shaft at a given rotational speed (i.e. the electrical power offtake) may be varied under control of a control signal. For example, a shaft may be coupled to the corresponding electrical generator via a gearbox so that the rotational speed of the rotor of the electrical generator may be varied, or means may be provided to adjust the current within field windings of the rotor of the generator. Electrical power output by the first and second generators 218, 220 is provided to second and first power output channels 234, 236 respectively. The engine system 210 further comprises a controller 232 arranged to receive a power demand signal at an input 238, the power demand signal corresponding an electrical power demand $P_1$ to be met or satisfied by the sub-system 212, and in response to output first and second control signals on outputs 240, 242 to the first and second electrical generators 218, 220 respectively such that the total electrical power output by the first and second generators 218, 220, and provided to the first and second power output channels 234, 236, is equal to $P_1$.

The controller 232 is arranged to output first and second control signals such that if the power demand $P_1$ is in the range $0<P_1 \leq P_m$ the amounts of electrical power output by the first and second generators 218, 220 are $yP_1$ and $(1-y)P_1$ respectively, where $0.5<y\leq 1$, that is, a majority of the power demand $P_1$ is met by output from the first generator 218 to the second output channel 236. Preferably y=1 so that the power demand $P_1$ is met entirely by the first generator 218 up to the maximum output power $P_m$ of the generator 218. If $P_m<2P_m$ then power in excess of $P_m$ is met by output from the second generator 220 and output on the first power output channel 234. The maximum electrical power output of the system 210 is $2P_m$.

By meeting the electrical power demand $P_1$ on the engine system 10 up to the value $P_m$ mostly, or preferably exclusively, by power offtake from the first generator 218, i.e. the generator coupled to the LP shaft 214 (or more generally the shaft having the lowest rotational speed during operation of the gas turbine engine), stress on the engine is reduced compared to the case where equal amounts of power are taken from both the first and second generators 218, 220, or where power is taken mostly, or exclusively, from the second generator 220. The reduction in engine stress allows critical components in the HP spool of the engine to be protected, whilst simultaneously slowing the rate of mechanical degradation of the engine and improving fuel consumption. This mode of operation results in power being extracted preferentially from the LP spool, which is better suited to performing mechanical work than the HP spool. Power is extracted from the HP spool, which is principally designed to perform aerodynamic work, only when the power demand $P_1$ cannot be met entirely by electrical power extraction from the LP spool.

The mechanical components and operational characteristics of a gas turbine engine degrade over time and an aircraft must be taken out of operation when one of its engines reaches a service point, i.e. when the engine reaches a condition requiring servicing of the engine (routine maintenance, overhaul or complete replacement of the engine). As each engine is unique and degrades at a different rate, the individual engines of an aircraft typically reach their respective service points at different times. This leads to an aircraft being taken out of operation whenever a single engine requires servicing, resulting in an aircraft being taken out of operation more frequently than if all service points are reached simultaneously, or alternatively all engines of an aircraft being serviced when only a single engine has reached a service point, even though the other engines possess at least some useful life at that time.

Published US patent application 2017/0324360 A1 describes a method of operating a multi-engine system in which each engine drives a respective electrical generator and the outputs of the electrical generators are applied to an electrical load which requires a specified amount of electrical power. The condition of each engine and its rate of degradation are monitored and the respective times at which the engines will reach their next service points are calculated. In order to arrange for the service points of the engines to occur simultaneously, or least to occur closer together in time, the rates of degradation of the engines are adjusted by appropriately apportioning the specified amount of electrical power between the engines so that each engine and its electrical generator delivers a different amount of electrical power to the load. However, simply apportioning the specified electrical power across the engines in this way so that only the total electrical power from a given engine is specified typically means that work is not efficiently extracted from the thermodynamic cycle of one or more of the engines so that the service point of the overall engine system occurs earlier than necessary. Furthermore, the electrical power requirements of aircraft auxiliary systems are typically more complex than simply providing a specified total electrical power to a single load. Normally at least two electrical channels are required and these are each required to deliver at least a minimum amount of electrical power. This is typically not achievable by simply specifying a respective total amount of electrical power to be derived from each engine and then associating a given electrical channel with a specific engine.

Figure 4:
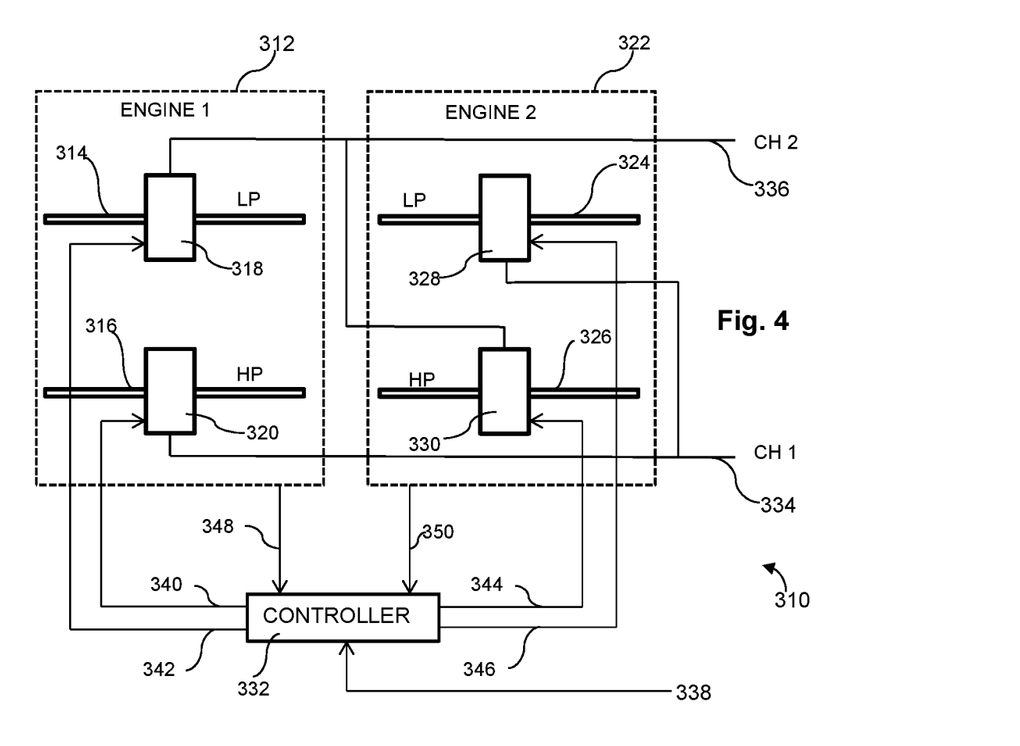
FIG. 4 shows a gas turbine engine system according to a second example, the system comprising two sub-systems each of which comprises a gas turbine engine and two electrical generators.

FIG. 4 shows a second example gas turbine engine system 310 comprising two sub-systems 312, 322 each comprising a respective gas turbine engine. The gas turbine engine of the first sub-system 312 has LP and HP shafts 314, 316 coupled to first and second electrical generators 318, 320 respectively. The gas turbine engine of the second sub-system 322 has LP and HP shafts 324, 326 coupled to third and fourth electrical generators 328, 330 respectively. Electrical power output by the second and third electrical generators 320, 324 is provided to a first power output channel 334; electrical power output by the first and fourth electrical generators 318, 330 is provided to a second power output channel 336. Each of the first, second, third and fourth electrical generators 318, 320, 324, 326 has a maximum electrical power output $P_m$.

The engine system 310 further comprises a controller 332 configured to receive at an input 338 a power demand signal corresponding to a total electrical power demand P required to be met or satisfied by the system 310. The controller 332 also receives engine data signals at inputs 348, 350, each of the engine data signals corresponding to parameters such as TGT, pressure and shaft speeds of the gas turbine engine of one of the sub-systems 312, 322. The controller 332 processes the engine data signals to determine the mechanical conditions, rates of mechanical degradation and hence remaining useful lives of the gas turbine engines. The remaining useful life of a gas turbine engine is the continuous operating period at the end of which the engine reaches a service condition requiring maintenance, overhaul or replacement. The controller 332 is arranged to determine a parameter x, where $0.5<x<1$, and to output control signals on outputs 340, 342, 344, 346 to the first, second, third and fourth electrical generators 318, 320, 322, 324 such that total electrical power demand P is apportioned between the first and second sub-systems 312, 322 such that the first sub-system 312 provides a portion xP and the second sub-system 322, provides a portion $(1-x)P$. The parameter x is determined such that the rates of degradation of the two gas turbines are adjusted so that the gas turbine engines of the sub-systems 312, 322 reach a service condition at respective times defining an interval which is shorter than for the case where $x=0.5$ (i.e. the electrical power offtake is the same for each sub-system) and preferably zero, in which case the engines reach the service condition simultaneously.

The controller 332 is arranged to control the individual electrical powers obtained from the first, second, third and fourth electrical generators 318, 320, 324, 326 depending on the value of the total electrical power demand P on the engine system 310. However the electrical power provided by the first and second sub-systems 312, 322 is always xP and $(1-x)P$ respectively for a total electrical power demand P, i.e. the first and second electrical generators 318, 320 always provide a total electrical power xP, and the third and fourth electrical generators 328, 330 always provide a total electrical power $(1-x)P$ when the total power demand is P.

If $0<P\leq P_m/x$ then the controller 332 controls the first to fourth electrical generators 318, 320, 328, 330 such that they generate the following amounts of electrical power:

| Generator | Sub-system 1 (312) | Generator | Sub-system 2 (322) |
| --- | --- | --- | --- |
| First (318) | xP | Third (324) | $(1-x)P$ |
| Second (320) | 0 | Fourth (326) | 0 |
| Total | xP | Total | $(1-x)P$ |

The amounts of electrical power provided to the first and second channels 334, 336 are:

| Channel 1 (334) | Channel 2 (336) | Total |
| --- | --- | --- |
| $(1-x)P$ | xP | P |

The total power P in this case is provided entirely by the first and third electrical generators 318, 324, i.e. electrical power offtake is only from the electrical generators 318, 324 coupled to the LP shafts 314, 324 of the gas turbine engines of sub-systems 312, 322. When $P=P_m/x$, the first and third generators 318, 324 generate powers $P_m$ and $(1-x)P_m/x$ respectively; these are also the amounts of power provided on the second 336 and first 334 power output channels respectively. For example if $x=0.8$ then the amounts of electrical power extracted from sub-systems 1 and 2 are 0.8P and 0.2P respectively and the amounts of electrical power provided to the first and second power output channels 334, 336 are 0.2P and 0.8P respectively.

If $P_m/x<P\leq 2P_m/x$ the controller 332 controls the electrical power output from each of the generators 318, 320, 324, 326 as follows:

| Generator | Sub-system 1 (312) | Generator | Sub-system 2 (322) |
| --- | --- | --- | --- |
| First (318) | $P_m$ | Third (324) | $(1-x)P_m/x$ |
| Second (320) | $xP - P_m$ | Fourth (326) | $(1-x)(xP - P_m)/x$ |
| Total | xP | Total | $(1-x)P$ |

The amounts of power provided to the first and second power output channels 334, 336 are:

| Channel 1 (332) | Channel 2 (334) | Total |
| --- | --- | --- |
| $xP - P_m(2 - 1/x)$ | $(1-x)P + P_m(2 - 1/x)$ | P |

The first and third generators 318, 324 are run to maximum powers of $P_m$ and $(1-x)P_m/x$ respectively and the remaining power demand $P-P_m/x$ is met by the second and fourth generators 320, 326. The total power demand P is apportioned between the first and second sub-systems 312, 322 in the ratio x, 1−x; this also applies to the apportioning of power offtake between corresponding generators of the sub-systems 312 and 322, i.e. the apportioning of power offtake between the first and third generators 314, 324, and between the second and fourth generators 320, 330.

If $x=0.8$ and the engine system 310 is used to provide a total power $2P_m$ (i.e. 80% of its maximum electrical output power of $2.5P_m$) then sub-system 312 provides a power $1.6P_m$ and sub-system 322 provides a power $0.4P_m$. However the output power $2P_m$ is more evenly divided between the two power output channels 334, 336 since the first channel 334 provides $0.85P_m$ and the second channel 336 provides $1.15P_m$. In other words the first and second channels 334, 336 provide respectively 42.5% and 57.5% of the total power output of $2P_m$. If $x=0.8$ and the total electrical demand P is $2.5P_m$ (i.e. 100% of the maximum electrical power that can be provided by the engine system 310 when $x=0.8$) then the powers provided by the two sub-systems 312, 322 are each $1.25P_m$ i.e. each channel provides half of the total output power of $2.5P_m$. The total electrical power extracted from the system 310 is therefore generally more evenly divided between the first 334 and second 336 channels than it is between the sub-systems 312, 322, which is a more suitable arrangement for electrical power delivery to auxiliary aircraft systems.

Figure 5:
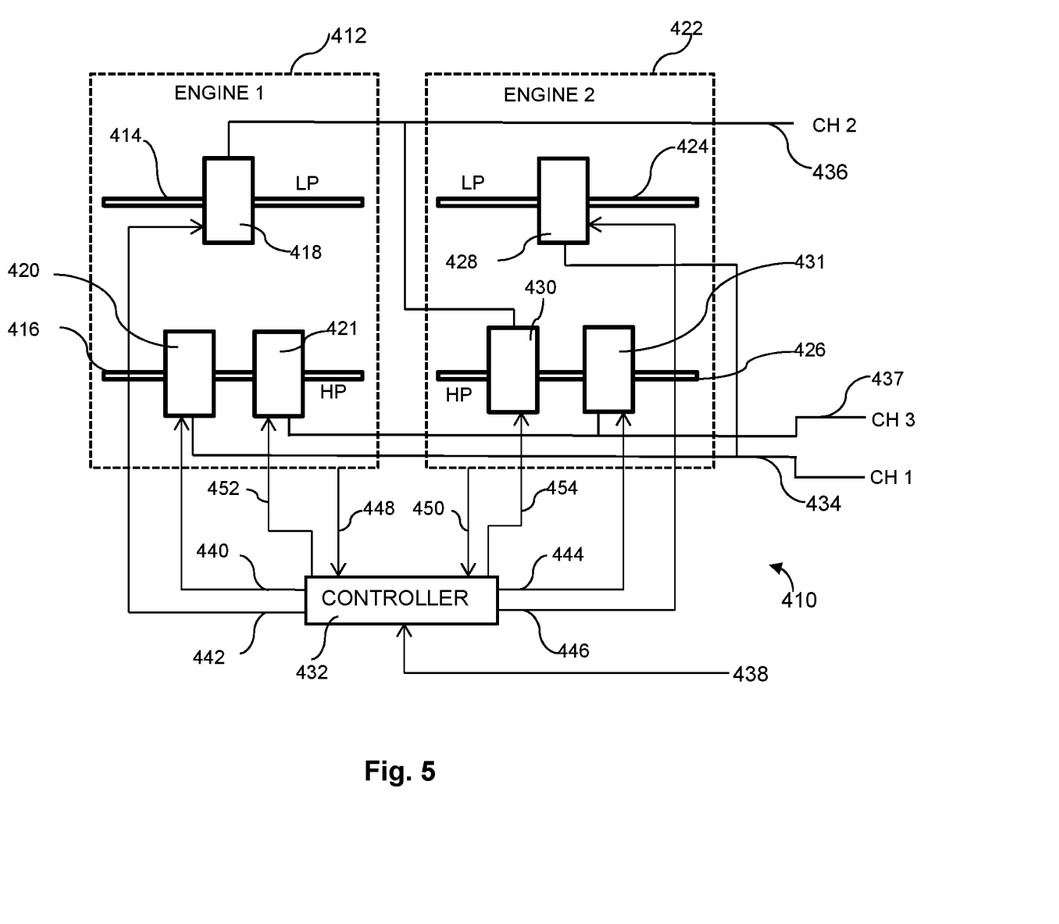
FIG. 5 shows a gas turbine engine system according to a third example, the system comprising two sub-systems each of which comprises a gas turbine engine and three electrical generators.

FIG. 5 shows an engine system 410 which is similar to the engine system 310 of FIG. 4. Parts of the engine system 410 are labelled using reference signs differing by 100 from those labelling corresponding parts in FIG. 2. First and second sub-systems 412, 422 of the engine system 410 each comprise an additional electrical generator; a fifth electrical generator 421 coupled to the HP shaft 416 of the gas turbine engine of sub-system 412, and a sixth electrical generator 431 coupled to the HP shaft of the gas turbine engine of sub-system 422. Controller 432 provides control signals to the fifth and sixth electrical generators 421, 431 on outputs 452, 454 respectively in order to control the electrical power outputs of those generators. The electrical outputs of the fifth and sixth generators 421, 431 are provided on a third electrical power output channel 438.

When the total electrical power demand P on the engine system 210 is in the range $0<P\leq P_m/x$ the controller 432 operates to control the first to sixth electrical generators 218, 220, 224, 221, 231 to provide electrical output powers as follows:

| Generator | Sub-system 1 | Generator | Sub-system 2 |
|---|---|---|---|
| First (418) | xP | Third (424) | (1 − x)P |
| Second (420) | 0 | Fourth (426) | 0 |
| Fifth (421) | 0 | Sixth (431) | 0 |
| Total | xP | Total | (1 − x)P |

| Channel 1 (434) | Channel 2 (436) | Channel 3 (437) | Total |
|---|---|---|---|
| (1 − x)P | xP | 0 | P |

In this case, electrical power is extracted only from the first and third electrical generators 418, 428 which are coupled to the LP shafts 414, 424 of the gas turbines engines of the first and second sub-systems 412, 422 respectively. Stress on the HP spools of the gas turbines engines is therefore reduced or avoided.

When P is in the range $P_m/x < P \leq (1+\varepsilon)P_m/x$, where $\varepsilon$ is a selectable parameter in the range $0.5 < \varepsilon \leq 1$, the controller 432 controls the first to sixth generators 418, 420, 421, 428, 430, 431 to provide output powers as follows:

| Generator | Sub-system 1 | Generator | Sub-system 2 |
|---|---|---|---|
| First (418) | $P_m$ | Third (424) | $(1-x)P_m/x$ |
| Second (420) | $xP - P_m$ | Fourth (426) | $(1-x)(xP - P_m)/x$ |
| Fifth (421) | 0 | Sixth (431) | 0 |
| Total | xP | Total | (1 − x)P |

| Channel 1 (432) | Channel 2 (434) | Channel 3 (438) | Total |
|---|---|---|---|
| $xP - P_m(2 - 1/x)$ | $(1-x)P + P_m(2-1/x)$ | 0 | P |

The second and fourth electrical generators 220, 230 are therefore controlled to provide the power $P - P_m/x$ which is not met by the first and third generators 418, 428.

When the total power demand P reaches the limit $(1+\varepsilon)P_m/x$, the controller 432 controls the first to sixth generators 418, 420, 428, 430, 421, 431 to provide the following amounts of output power:

| Generator | Sub-system 1 | Generator | Sub-system 2 |
|---|---|---|---|
| First (418) | $P_m$ | Third (424) | $(1-x)P_m/x$ |
| Second (420) | $\varepsilon P_m$ | Fourth (426) | $(1-x)\varepsilon P_m/x$ |
| Fifth (421) | 0 | Sixth (431) | 0 |
| Total | $(1 + \varepsilon)P_m$ | Total | $(1-x)(1+\varepsilon)P_m/x$ |

| Channel 1 (434) | Channel 2 (436) | Channel 3 (437) | Total |
|---|---|---|---|
| $P_m/x - P_m(1-\varepsilon)$ | $\varepsilon P_m/x + P_m(1-\varepsilon)$ | 0 | $(1+\varepsilon)P_m/x$ |

For example if $\varepsilon=0.9$ then the second generator 420 will not provide a power more than $0.9P_m$. If in addition x=0.8, then the first and second generators 418, 420 provide powers $P_m$ and $0.9P_m$ respectively, the third and fourth generators 424, 426 provide powers $0.25P_m$ and $0.225P_m$ respectively.

The first and second sub-systems 412, 422 therefore provide $1.9P_m$ and $0.475P_m$ respectively, i.e. the total electrical output power of the engine system 410 is $2.375P_m$. The total output power of $2.375P_m$ is provided as portions $1.15P_m$ on the first output channel 434 and $1.225P_m$ on the second output channel 436. The parameters may be selected to provide a safety margin to ensure that the second generator 420 does not generate more than a power $\varepsilon P_m$.

If the total power demand P is in the range $(1+\varepsilon)P_m/x < P \leq 3P_m/x$ then the amounts of power provided by the generators and power output channels are as follows:

| Generator | Sub-system 1 | Generator | Sub-system 2 |
|---|---|---|---|
| First (418) | $P_m$ | Third (424) | $(1-x)P_m/x$ |
| Second (420) | $(xP - P_m)/2$ | Fourth (426) | $(1-x)(xP - P_m)/2x$ |
| Fifth (421) | $(xP - P_m)/2$ | Sixth (431) | $(1-x)(xP - P_m)/2x$ |
| Total | xP | Total | (1 − x)P |

| Channel 1 (434) | Channel 2 (436) | Channel 3 (437) | Total |
|---|---|---|---|
| $xP/2 - 3P_m/2 + P_m/x$ | $3P_m/2 - xP/2 + (P - P_m/x)/2$ | $(P - P_m/x)/2$ | P |

The power demand on the first sub-system 412 in excess of $P_m$ is divided equally between the second and fifth electrical generators 420, 421. Similarly, the power demand on the second sub-system 422 in excess of $(1-x)P_m/x$ is divided equally between the fourth and sixth electrical generators 430, 431. This retains a balanced offtake per generator and reduces transient stress and also provides electrical power output on the third channel 437 providing a further channel for delivery of electrical power to auxiliary aircraft systems. At the limit $P=3P_m/x$, the first, second and fifth generators 418, 420, 421 each provided a power output $P_m$ and the third, fourth and sixth generators 428, 430, 431 each provide a power $(1-x)P_m/x$. A power of $P_m/x$ is provided on each of the power output channels 434, 436, 437.

For example if x=0.8, then $3P_m/x=3.75P_m$. If the total electrical power extracted from the engine system 210 is 80% of $3.75P_m$ then the total electrical power output P is $3P_m$. The power output from the various generators and channels is then:

| Generator | Sub-system 1 | Generator | Sub-system 2 |
|---|---|---|---|
| First (418) | $P_m$ | Third (424) | $0.25P_m$ |
| Second (420) | $0.7P_m$ | Fourth (426) | $0.175P_m$ |
| Fifth (421) | $0.7P_m$ | Sixth (431) | $0.175P_m$ |
| Total | $2.4P_m$ | Total | $0.6P_m$ |

| Channel 1 (434) | Channel 2 (436) | Channel 3 (437) | Total |
|---|---|---|---|
| $0.95P_m$ | $1.175P_m$ | $0.875P_m$ | $3P_m$ |

If the total power demand P is greater than $3P_m/x$, the third, fourth and sixth generators 428, 430, 431 may be operated such that one or more of these generators provides an electrical power output greater than $P_m/x$ although this will result in the service conditions of the two gas turbine engines of the sub-systems 412, 422 not being reached at times which define a minimum possible interval (for example simultaneously).

In a variant of the system 210 described above with reference to FIG. 3, the maximum power outputs of the generators 218, 220 are $P_{m1}$ and $P_{m2}$ respectively, where $P_{m1} \neq P_{m2}$. When the electrical power demand $P_1$ on the system 210 is less than $P_{m1}$, all of the power demand is met by the first generator 218 and the power extracted from the second generator 220 is zero. When the electrical power demand $P_1$ exceeds $P_{m1}$, a power $P_{m1}$ is extracted from the first generator 218 and a power $P_1$-$P_{m1}$ is extracted from the second generator 220. The maximum electrical power output of the system 210 is $P_{m1}+P_{m2}$.

In a variant of the system 310 described above with reference to FIG. 4, the first and third generators 318, 328 each have maximum electrical power output $P_{m1}$ and the second and fourth generators 320, 330 each have a maximum electrical power output $P_{m2}$, where $P_{m1} \neq P_{m2}$. The electrical powers output by the individual generators 318, 320, 324, 326, by the sub-systems 312, 322 and on channels 1, 2 334, 336 in the case of four different values or ranges of total electrical demand P on the system 310 are as follows:

Case (i): $P<P_{m1}/x$

| Generator | Sub-system 1 (312) | Generator | Sub-system 2 (322) |
|---|---|---|---|
| First (318) | xP | Third (324) | (1 − x)P |
| Second (320) | 0 | Fourth (326) | 0 |
| Total | xP | Total | (1 − x)P |

| Channel 1 (334) | Channel 2 (336) | Total |
|---|---|---|
| (1 − x)P | xP | P |

Power extracted from generators 318, 328=P
Power extracted from generators 320, 330=0

Case (ii) $P=P_{m1}/x$

| Generator | Sub-system 1 (312) | Generator | Sub-system 2 (322) |
|---|---|---|---|
| First (318) | $P_{m1}$ | Third (324) | $(1-x)P_{m1}/x$ |
| Second (320) | 0 | Fourth (326) | 0 |
| Total | $P_{m1}$ | Total | $(1-x)P_{m1}/x$ |

| Channel 1 (334) | Channel 2 (336) | Total |
|---|---|---|
| $(1-x)P_{m1}/x$ | $P_{m1}$ | $P_{m1}/x$ |

Power extracted from generators 318, 328=$P_{m1}/x$
Power extracted from generators 320, 330=0

Case (iii): $P_{m1}/x < P < (P_{m1}+P_{m2})/x$

| Generator | Sub-system 1 (312) | Generator | Sub-system 2 (322) |
|---|---|---|---|
| First (318) | $P_{m1}$ | Third (324) | $(1-x)P_{m1}/x$ |
| Second (320) | $xP - P_{m1}$ | Fourth (326) | $(1-x)(xP - P_{m1})/x$ |
| Total | xP | Total | (1 − x)P |

| Channel 1 (334) | Channel 2 (336) | Total |
|---|---|---|
| $xP - P_{m1}(2 - 1/x)$ | $(1-x)P + P_{m1}(2-1/x)$ | P |

Power extracted from generators 318, 328=$P_{m1}/x$
Power extracted from generators 320, 330=$(xP-P_{m1})/x$ Case (iv): $P=(P_{m1}+P_{m2})/x$

| Generator | Sub-system 1 (312) | Generator | Sub-system 2 (322) |
|---|---|---|---|
| First (318) | $P_{m1}$ | Third (324) | $(1-x)P_{m1}/x$ |
| Second (320) | $P_{m2}$ | Fourth (326) | $(1-x)P_{m2}/x$ |
| Total | $P_{m1}+P_{m2}$ | Total | $(1-x)(P_{m1}+P_{m2})/x$ |

| Channel 1 (334) | Channel 2 (336) | Total |
|---|---|---|
| $P_{m1} + (1-x)P_{m2}/x$ | $P_{m2} + (1-x)P_{m1}/x$ | $(P_{m1}+P_{m2})/x$ |

Power extracted from generators 318, 328=$P_{m1}/x$
Power extracted from generators 320, 330=$P_{m2}/x$ In variant of the system 410 described above with reference to the FIG. 5, the first and third generators 418, 428 each have a maximum electrical power output $P_{m1}$, the second and fourth generators 420, 430 each have a maximum electrical power output $P_{m2}$ and the fifth and sixth generators 421, 431 each have a maximum electrical power output $P_{m3}$ where $P_{m1} \neq P_{m2} \neq P_{m3}$. The electrical powers output by the individual generators 414, 416, 424, 430, 421, 431, by the sub-systems 412, 422 and on channels 1, 2, 3 434, 436, 438 in the case of six different values or ranges of total electrical demand P on the system 410 are as follows (where $\Sigma = P_{m1}+P_{m2}+P_{m3}$):

Case (i): $P<P_{m1}/x$:

| Generator | Sub-system 1 | Generator | Sub-system 2 |
|---|---|---|---|
| First (418) | xP | Third (424) | (1 − x)P |
| Second (420) | 0 | Fourth (426) | 0 |
| Fifth (421) | 0 | Sixth (431) | 0 |
| Total | xP | Total | (1 − x)P |

| Channel 1 (434) | Channel 2 (436) | Channel 3 (437) | Total |
|---|---|---|---|
| (1 − x)P | xP | 0 | P |

Power extracted from generators 418 and 424=P
Power extracted from generators 420 and 426=0
Power extracted from generators 421 and 431=0

Case (ii): $P=P_{m1}/x$:

| Generator | Sub-system 1 | Generator | Sub-system 2 |
|---|---|---|---|
| First (418) | $P_{m1}$ | Third (424) | $(1-x)P_{m1}/x$ |
| Second (420) | 0 | Fourth (426) | 0 |
| Fifth (421) | 0 | Sixth (431) | 0 |
| Total | $P_{m1}$ | Total | $(1-x)P_{m1}/x$ |

| Channel 1 (434) | Channel 2 (436) | Channel 3 (437) | Total |
|---|---|---|---|
| $(1 - x)P_{m1}/x$ | $P_{m1}$ | 0 | $P_{m1}/x$ |

Power extracted from generators 418 and 424=$P_{m1}/x$
Power extracted from generators 420 and 426=0
Power extracted from generators 421 and 431=0
Case (iii): $P_{m1}/x < P < (P_{m1} + \varepsilon P_{m2})/x$:

| Generator | Sub-system 1 | Generator | Sub-system 2 |
|---|---|---|---|
| First (418) | $P_{m1}$ | Third (424) | $(1 - x)P_{m1}/x$ |
| Second (420) | $xP - P_{m1}$ ($<\varepsilon P_{m2}$) | Fourth (426) | $(1 - x)(xP - P_{m1})/x$ |
| Fifth (421) | 0 | Sixth (431) | 0 |
| Total | $xP$ | Total | $(1 - x)P$ |

| Channel 1 (434) | Channel 2 (436) | Channel 3 (437) | Total |
|---|---|---|---|
| $xP - P_{m1}(2 - 1/x)$ | $(1 - x)P + P_{m1}(2 - 1/x)$ | 0 | P |

Power extracted from generators 418 and 424=$P_{m1}/x$
Power extracted from generators 420 and 426=$P - P_{m1}/x$
Power extracted from generators 421 and 431=0
Case (iv): $P = (P_{m1} + \varepsilon P_{m2})/x$:

| Generator | Sub-system 1 | Generator | Sub-system 2 |
|---|---|---|---|
| First (418) | $P_{m1}$ | Third (424) | $(1 - x)P_{m1}/x$ |
| Second (420) | $\varepsilon P_{m2}$ | Fourth (426) | $(1 - x)\varepsilon P_{m2}/x$ |
| Fifth (421) | 0 | Sixth (431) | 0 |
| Total | $P_{m1} + \varepsilon P_{m2}$ | Total | $(1 - x)(P_{m1} + \varepsilon P_{m2})/x$ |

| Channel 1 (434) | Channel 2 (436) | Channel 3 (437) | Total |
|---|---|---|---|
| $\varepsilon P_{m2} + (1 - x) P_{m1}/x$ | $P_{m1} + (1 - x)\varepsilon P_{m2}/x$ | 0 | $(P_{m1} + \varepsilon P_{m2})/x$ |

Power extracted from generators 418 and 424=$P_{m1}/x$
Power extracted from generators 420 and 426=$\varepsilon P_{m2}/x$
Power extracted from generators 421 and 431=0
Case (v): $(P_{m1} + \varepsilon P_{m2})/x < P < \Sigma/x$:

| Generator | Sub-system 1 | Generator | Sub-system 2 |
|---|---|---|---|
| First (418) | $P_{m1}$ | Third (424) | $(1 - x)P_{m1}/x$ |
| Second (420) | $(xP - P_{m1})/2$ | Fourth (426) | $(1 - x)(xP - P_{m1})/2x$ |
| Fifth (421) | $(xP - P_{m1})/2$ | Sixth (431) | $(1 - x)(xP - P_{m1})/2x$ |
| Total | $xP$ | Total | $(1 - x)P$ |

(Note: $xP - P_{m1} > \varepsilon P_{m2}$)

| Channel 1 (434) | Channel 2 (436) | Channel 3 (437) | Total |
|---|---|---|---|
| $xP/2 + (2 - 3x)P_{m1}/2x$ | $(1 - x)P/2 + (3x - 1)P_{m1}/2x$ | $P/2 - P_{m1}/2x$ | P |

Power extracted from generators 418 and 424=$P_{m1}/x$
Power extracted from generators 420 and 426=$(xP-P_{m1})/2x$
Power extracted from generators 421 and 431=$(xP-P_{m1})/2x$
Case (vi): $P = \Sigma/x$:

| Generator | Sub-system 1 | Generator | Sub-system 2 |
|---|---|---|---|
| First (418) | $P_{m1}$ | Third (424) | $(1 - x)P_{m1}/x$ |
| Second (420) | $P_{m2}$ | Fourth (426) | $(1 - x)P_{m2}/x$ |
| Fifth (421) | $P_{m3}$ | Sixth (431) | $(1 - x)P_{m3}/x$ |
| Total | $\Sigma$ | Total | $(1 - x)\Sigma/x$ |

| Channel 1 (434) | Channel 2 (436) | Channel 3 (437) | Total |
|---|---|---|---|
| $P_{m2} + (1 - x)P_{m1}/x$ | $P_{m1} + (1 - x)P_{m2}/x$ | $P_{m3}/x$ | $\Sigma/x$ |

Power extracted from generators 418 and 424=$P_{m1}/x$
Power extracted from generators 420 and 426=$P_{m2}/x$
Power extracted from generators 421 and 431=$P_{m3}/x$ The gas turbine engines of the sub-systems 212, 312, 322, 412, 422 may each have exactly two spools or more than two spools. For example, such a gas turbine engine may have three spools, i.e. a low pressure (LP) spool, an intermediate pressure (IP) spool and a high pressure (HP) spool. In this case, the LP and HP spools referred to above may correspond respectively to the LP and IP spools, the IP and HP spools or the LP and HP spools; in other words in the foregoing description "LP" and "HP" may be more generally interpreted as "lower pressure" and "higher pressure" respectively. It should also be noted that sometimes the lower and higher pressure spools in a two-spool gas turbine engine are labelled or designated respectively as IP and HP spools (rather than LP and HP spools), and sometimes they are labelled as LP and IP spools respectively.

The invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A gas turbine engine system comprising:
a first sub-system having a first gas turbine engine and first and second electrical generators arranged to be driven by first and second spools respectively of the first gas turbine engine, the first electric generator having a maximum power output $P_{m1}$, the first spool of the first gas turbine engine having a lower rotational speed than the second spool of the first gas turbine engine during operation of the gas turbine engine;
a second sub-system having a second gas turbine engine, a third electrical generator, and a fourth electrical generator, wherein the third electrical generator and the fourth electrical generator is arranged to be driven by first and second spools, respectively, of the second gas turbine engine, the third electrical generator having a maximum output power $P_{m1}$, the first spool of the second gas turbine engine having a lower rotational speed than the second spool thereof during operation of the second gas turbine engine; and
a controller configured to provide first and second control signals to the first and second electrical generators, respectively, to control the electrical power extracted therefrom and to provide third and fourth control signals to the third and fourth generators, respectively, to control the electrical power extracted therefrom, the controller being configured to receive a demand signal corresponding to a total electrical power demand P to be met by the engine system and to provide the first to fourth control signals in response thereto such that the demand P is met by extraction of electrical powers xP, $(1-x)P$ from the first and second sub-systems, respectively, wherein $0.5<x<1$, and wherein if $P \leq P_{m1}/x$, electrical powers xP, $(1-x)P$ are extracted from the first and third electrical generators, respectively.

2. The gas turbine engine system according to claim 1, wherein the second and third generators provide electrical power output on a first power output channel, and the first and fourth electrical generators provide power output on a second power output channel.

3. The gas turbine engine system according to claim 2, wherein the second and fourth generators each have a maximum power output $P_{m2}$ and the controller is arranged to provide the first to fourth control signals in response to the demand signal such that if the total electrical power demand P is in the range $P_{m1}/x < P \leq (P_{m1}+\varepsilon P_{m2})/x$, where $0.5 \leq \varepsilon \leq 1$, the electrical powers extracted from the first to fourth electrical generators are $P_m$, $xP-P_{m1}$, $(1-x)P_{m1}/x$ and $(1-x)(xP-P_{m1})/x$ respectively.

4. The gas turbine engine system according to claim 3, wherein the first sub-system further comprises a fifth electrical generator arranged to be driven by the second spool of the first gas turbine engine and the second sub-system further comprises a sixth electrical generator arranged to be driven by the second spool of the second gas turbine engine, the controller is arranged to provide fifth and sixth control signals to the fifth and sixth electrical generators respectively to control the electrical power extracted therefrom and wherein the fifth and sixth electrical generators provide power output on a third power output channel.

5. The gas turbine engine system according to claim 4, wherein the fifth and sixth generators each have a maximum power output $P_{m3}$ and the controller is arranged to provide the first to sixth control signals in response to the demand signal such that if the total electrical power demand P is in the range $(P_{m1}+\varepsilon P_{m2})/x < P \leq (P_{m1}+P_{m2}+P_{m3})/x$, then the powers extracted from the first to sixth electrical generators are $P_m$, $(xP-P_{m1})/2$, $(1-x)P_{m1}/x$, $(1-x)(xP-P_{m1})/2x$, $(xP-P_{m1})/2$, $(1-x)(xP-P_{m1})/2x$ respectively.

6. The gas turbine engine system according to claim 1, wherein the controller is arranged to receive first and second data signals from the first and second gas turbine engines respectively, the first and second data signals corresponding to the remaining useful life and rate of mechanical degradation of the first and second gas turbines engines respectively, and to determine the fraction x such that the rates of mechanical degradation of the two gas turbine engines are adjusted so that the first and second gas turbine engines will reach their next service points at respective times defining an interval which is smaller than would be the case if x=0.5, and preferably equal to zero.

7. The gas turbine engine system according to claim 6, wherein the TGT temperature of a given gas turbine engine is used as a measure of the rate of mechanical degradation of that gas turbine engine.

8. A method of controlling electrical power extraction from an engine system, the method comprising:
receiving a demand signal corresponding to a total electrical power demand P to be met by the engine system, wherein the engine system comprises:
a first sub-system comprising a first gas turbine engine and first and second electrical generators arranged to be driven by first and second spools respectively of the first gas turbine engine, the first electrical generator having a maximum output power $P_{m1}$, the first spool having a lower rotational speed than the second spool during operation of the gas turbine engine; and
a second sub-system comprising a second gas turbine engine and third and fourth electrical generators arranged to be driven by first and second spools, respectively, of the second gas turbine engine, the third electrical generator having a maximum output power $P_{m1}$, the first spool of the second gas turbine engine having a lower rotational speed than the second spool thereof during operation of the second gas turbine engine; and
in response to the demand signal, providing first to fourth control signals to the first to fourth electrical generators to control the electrical power extracted therefrom, such that the demand P is met by extraction of electrical powers xP, $(1-x)P$ from the first and second sub-systems, respectively, wherein $0.5<x<1$, and wherein if $P P_{m1}/x$, electrical powers xP, $(1-x)P$ are extracted from the first and third electrical generators, respectively.

* * * * *